Aug. 12, 1952     A. H. RINGSTAD     2,606,979
ELECTRIC CORD REEL

Filed Feb. 11, 1947     2 SHEETS—SHEET 1

INVENTOR.
ARTHUR H. RINGSTAD
BY
Glenn L. Fish
ATTORNEY

Aug. 12, 1952     A. H. RINGSTAD     2,606,979
ELECTRIC CORD REEL

Filed Feb. 11, 1947     2 SHEETS—SHEET 2

INVENTOR.
ARTHUR H. RINGSTAD
BY
Glenn L. Fish
ATTORNEY

Patented Aug. 12, 1952

2,606,979

UNITED STATES PATENT OFFICE 2,606,979

ELECTRIC CORD REEL

Arthur H. Ringstad, Spokane, Wash., assignor of one-half to Marvin P. Ross, Spokane, Wash.

Application February 11, 1947, Serial No. 727,785

1 Claim. (Cl. 191—12.4)

My present invention relates to an improved electric cord reel of the type especially adapted for use with electric home appliances such as irons where the conventional cord becomes tangled or obstructs the smooth and efficient operation.

According to my invention the cord for the appliance, especially an iron, is mounted upon a spring retracted reel, and the ends of the cord are electrically connected to rotary brushes engaging stationary connectors.

In the accompanying drawings I have illustrated one complete example of the physical embodiment of my invention according to the best mode I have thus far devised, but it will be understood that various changes and alterations may be made in the exemplified structure within the scope of the appended claim.

Figure 1:
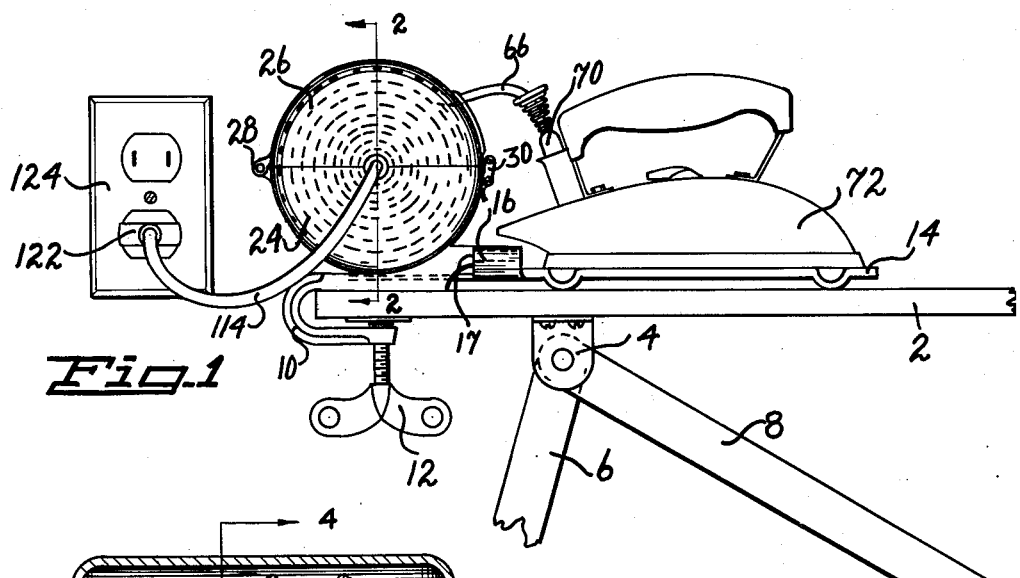
Fig. 1 is a side elevational view showing the invention mounted upon its base having an ironing cord reeled therein, and plugged into an outlet in the wall.
Figure 2:
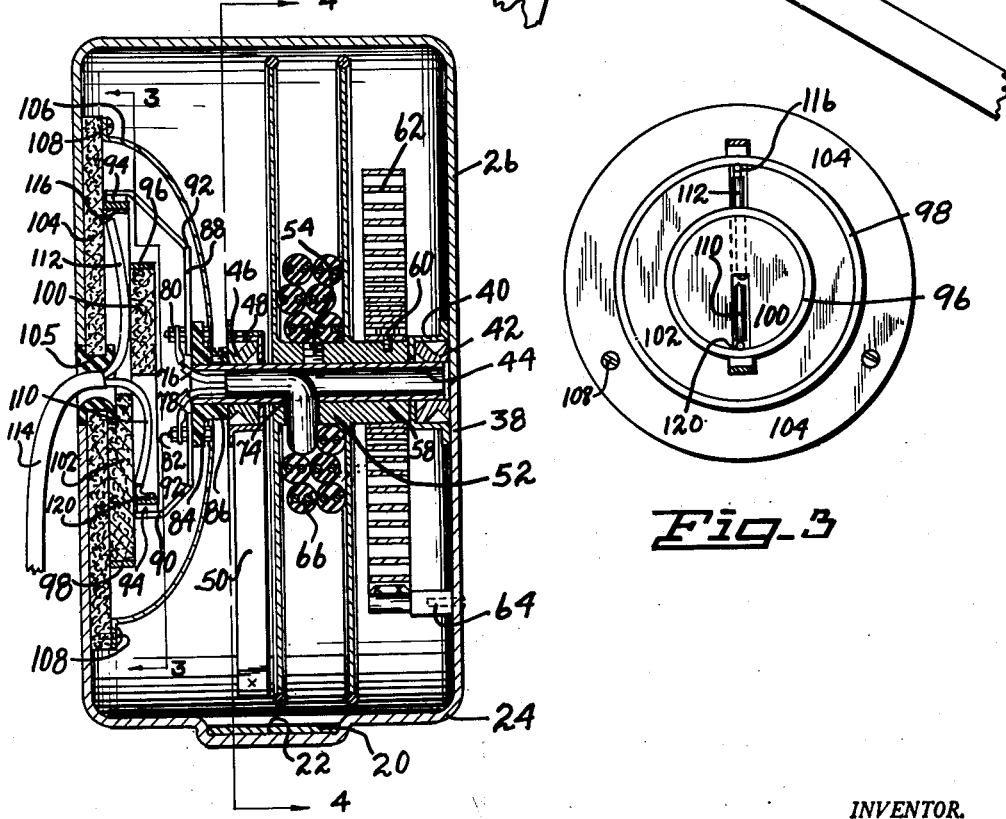
Fig. 2 is a vertical sectional view taken on line 2—2 of Fig. 1.
Figure 3:
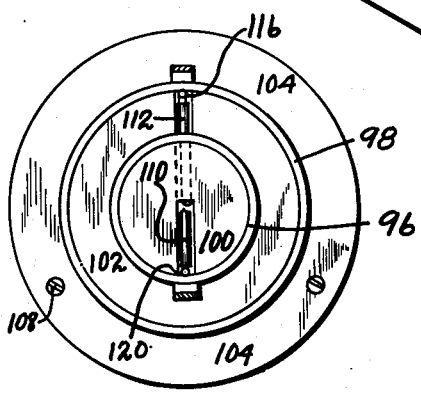
Fig. 3 is a fragmentary view showing the contact rings (and brushes) mounted upon insulated material taken on line 3—3 of Fig. 2.
Figure 4:
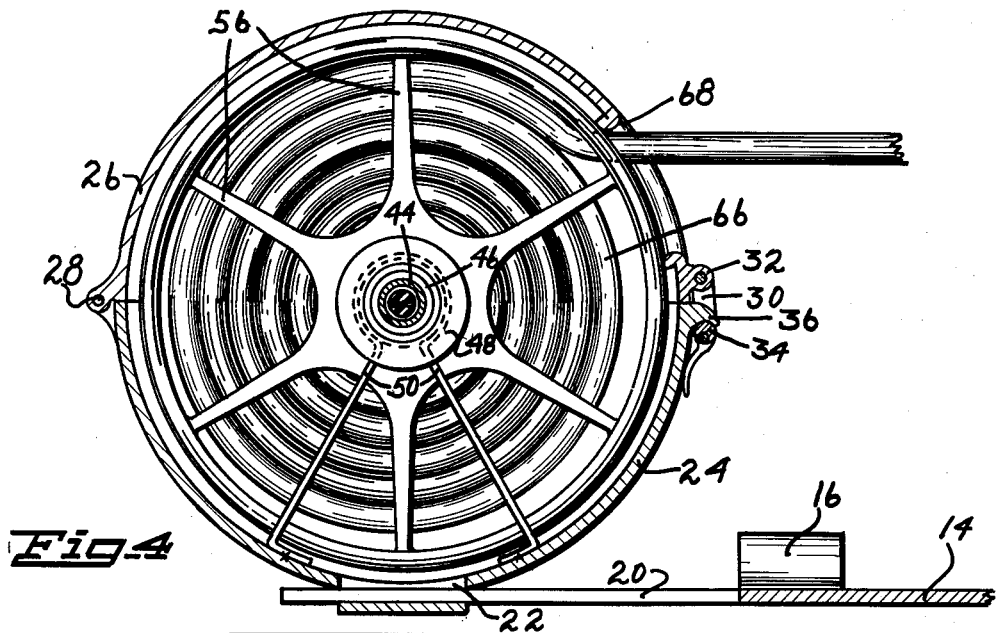
Fig. 4 is a section taken on line 4—4 of Fig. 2.
Figure 5:
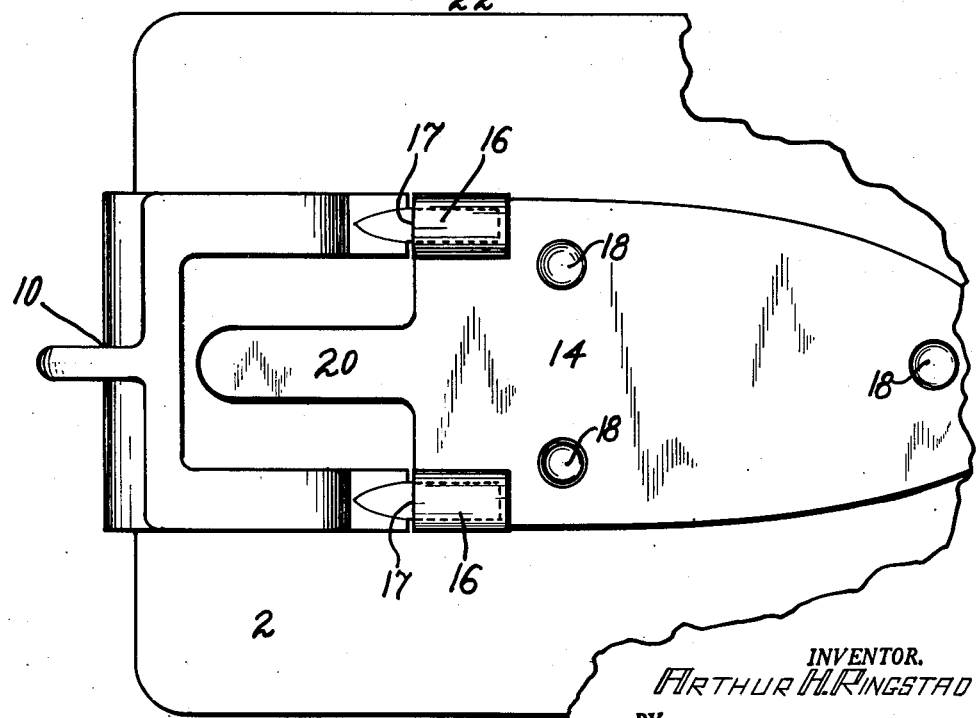
Fig. 5 is a plan view of the base and iron rest with the housing removed.

Referring now to the drawings wherein I have illustrated the present preferred embodiment of my invention I have shown an ironing board 2 having a bracket 4 for legs 6 and brace 8, upon which board is attached the bracket 10 having a clamp bolt 12. Secured to the bracket 10 I use an iron support 14 formed with stops 16 fitting snugly on bars 17 and depressed lugs 18 and a rear tongue 20 which fits into the slot 22 of the lower half 24 of the drum housing. The upper half 26 is hinged to the lower half at 28 and a latch 30 secured to the lug 32 has a bar 34 engageable with the nose 36 of the lower half.

Within the housing and attached to the wall 38 I employ a case 40 confining a bearing 42 for the hollow shaft 44 and the shaft is supported at its inner end on a bearing 46 in a case 48 supported by arms 50.

A hub-sleeve 52 is secured by set screw 54 to the shaft and the spider frames 56 form a reel on the sleeve. On an extension 58 of the sleeve I attach by screw 60 a flat-ribbon spring 62 the outer end of which is secured to the wall 38 by bracket 64.

A wire cord 66 is wound on the reel, the outer layer of which extends through the aperture collar 68 to the connector 70 for the iron 72. The inner end of the cord passes through an opening 74 in the shaft 44 and the wires 76 and 78 are secured to connecters 80 and 82 respectively on opposite sides of the insulating disk 84 of collar 86 on the end of the shaft 44.

Connecter arms 88 and 90 extend from the disk radially and are bent as at 92 and each arm at its end has a carbon brush 94.

These brushes frictionally engage the collector rings 96 and 98 on the insulating disks 100 and 102, the ring 96 and disk 100 being of smaller diameter than the ring 98 and its disk 102, and the latter disk and ring are insulated from the housing by disk 104 apertured at 105 and having shield 106 secured thereto by screws 108 and spaced about the collar 86.

Wires 110 and 112 of the cord 114 are secured at 116 and 120 to the collector rings, and the plug 122 may be inserted into the wall outlet 124.

Having thus fully described my invention what I claim as new and desire to secure by Letters Patent is:

An electric cord reel comprising a housing having upper and lower portions hingedly connected and a latch adapted to secure the housing portions in closed position, a cord aperture in said upper portion, a tubular shaft journaled at one end on a wall of the housing, a spaced bearing for supporting the inner end of said tubular shaft, arms for supporting the spaced bearing, a reel having a hub-sleeve mounted on the shaft, a set screw threaded through said sleeve and impinging against said tubular shaft for securing the reel, an extension on the sleeve, a flat-ribbon spring secured at one end to the extension and at the other end to said wall of the housing, an electric cord wound upon the reel having its inner end extending through aligned openings in the hub-sleeve and the tubular shaft into the hollow center of said shaft, an insulating collar on the inner end of said shaft, concentric insulating discs mounted on an opposite wall of the housing, peripheral collector rings on the insulating discs, arms radiating from said collar each having a brush bearing against companion ones of said collector rings, said arms being connected to the end of said electric cord extending into the shaft at said collar, and a source of electrical energy for the collector rings.

ARTHUR H. RINGSTAD.

REFERENCES CITED

The following references are of record in the file of this patent:

UNITED STATES PATENTS

| Number | Name | Date |
|---|---|---|
| 1,297,146 | Gleason | Mar. 11, 1919 |
| 1,411,206 | Dorion | Mar. 28, 1922 |
| 1,946,128 | Brosilow et al. | Feb. 6, 1934 |
| 2,074,305 | Tornblom | Mar. 16, 1937 |
| 2,159,004 | Bosch | May 23, 1939 |